United States Patent
Lin et al.

(10) Patent No.: US 8,792,067 B2
(45) Date of Patent: Jul. 29, 2014

(54) DISPLAY MODULE

(75) Inventors: Nien-Wei Lin, Taipei (TW); Huang-Lin Lee, Taipei (TW)

(73) Assignee: Compal Electronics, Inc., Taipei (TW)

( * ) Notice: Subject to any disclaimer, the term of this patent is extended or adjusted under 35 U.S.C. 154(b) by 44 days.

(21) Appl. No.: 13/433,303

(22) Filed: Mar. 29, 2012

(65) Prior Publication Data
US 2013/0057800 A1    Mar. 7, 2013

Related U.S. Application Data

(60) Provisional application No. 61/531,085, filed on Sep. 5, 2011.

(51) Int. Cl.
*G02F 1/1333*    (2006.01)
*G06F 1/16*    (2006.01)

(52) U.S. Cl.
CPC .................................... *G06F 1/1637* (2013.01)
USPC .................................. 349/58; 349/59; 349/60

(58) Field of Classification Search
CPC .................. G02F 1/133308; G02F 1/133608; G02F 2201/465; G02F 2001/133628; G02F 2001/133325; G02F 2202/28; G02F 2201/46; G02F 2201/36
USPC ........................................................ 349/58–60
See application file for complete search history.

(56) References Cited

U.S. PATENT DOCUMENTS

| | | | |
|---|---|---|---|
| 2007/0242182 A1* | 10/2007 | Hong et al. | 349/58 |
| 2011/0037719 A1* | 2/2011 | Choi | 345/173 |
| 2011/0261283 A1* | 10/2011 | Kim et al. | 349/58 |

* cited by examiner

*Primary Examiner* — Bumsuk Won
*Assistant Examiner* — Charles Chang
(74) *Attorney, Agent, or Firm* — Jianq Chyun IP Office

(57) ABSTRACT

A display module including a display panel, at least one bracket, a protective plate, a plurality of assembling elements and a back cover is provided. The display panel has a display surface and a back surface opposite to the display surface. The bracket is fixed to the display panel. The protective plate faces the display surface. The assembling elements are fixed on the protective plate, wherein each of the assembling elements has a positioning protrusion and an engaging slot. And the bracket is positioned on the assembling elements through the positioning protrusions. The back cover faces the back surface, wherein the back cover is engaged to the assembling elements through the engaging slots.

11 Claims, 3 Drawing Sheets

8,792,067 B2

DISPLAY MODULE

CROSS-REFERENCE TO RELATED APPLICATION

This application claims the priority benefits of U.S. provisional application Ser. No. 61/531,085, filed on Sep. 5, 2011. The entirety of the above-mentioned patent application is hereby incorporated by reference herein and made a part of this specification.

BACKGROUND OF THE INVENTION

1. Field of the Invention

The present invention generally relates to a display module. More particularly, the present invention relates to a display module having a plurality of assembling elements.

2. Description of Related Art

Along with the development of technology, portable electronic devices, such as notebook computers and tablet personal computers (tablet PC) are now in widespread use. Most of those portable electronic devices have display modules and each display module may include a bracket, a display panel fixed to the bracket and a glass plate attached to the display panel and a back cover covering the display panel. In general, the display panel and the bracket are attached to the glass plate by using a double-sided foam tape sandwiched between thereof. And the back cover is fixed to the display panel and the bracket by means of screwing.

However in such configuration, the assembly of the glass plate and the back cover is rather complicated and it may lead to the increase of the assembling tolerances thereof, and thus the assembly clearance and the gap difference may not be well controlled. Moreover, the operation of the double-sided foam tape is not easy, and it usually causes the display panel and the whole structure of display module damage during disassembling and repairing the components. Therefore, it is an important issue of the computer industry to provide a display module having the advantage of easily disassemble for repairs the components of the display module.

SUMMARY OF THE INVENTION

Accordingly, the present invention provides a display module capable to easily disassemble the components of the display module. The display module includes a display panel, at least one bracket, a protective plate, a plurality of assembling elements and a back cover. The display panel has a display surface and a back surface opposite to the display surface. The bracket is fixed to the display panel. The protective plate faces the display surface. The assembling elements are fixed on the protective plate, wherein the bracket is fixed on the assembling elements. The back cover faces the back surface, wherein the back cover is engaged to the assembling elements.

According to one embodiment of the present invention, each of the assembling elements has a positioning protrusion and the bracket is fixed on the assembling elements through the positioning protrusions.

According to one embodiment of the present invention, the bracket has a plurality of positioning holes, and the positioning protrusions are respectively inserted into the positioning holes.

According to one embodiment of the present invention, each of the assembling elements has an engaging slot, and the back cover is engaged to the assembling elements through the engaging slots.

According to one embodiment of the present invention, the back cover has a plurality of hooks respectively engaged into the engaging slots.

According to one embodiment of the present invention, each of the hooks is adapted to slide into the corresponding engaging slot along a direction parallel to the back surface when the back cover is engaged to the assembling elements.

According to one embodiment of the present invention, each of the assembling elements has an attaching surface and is fixed to the protective plate through an adhesive adhered between the attaching surface and the protective plate.

According to one embodiment of the present invention, each of the assembling elements further has at least one wall disposed on the attaching surface and surrounding the adhesive.

According to one embodiment of the present invention, each of the assembling elements further has at least one overflow groove disposed on the attaching surface and receiving the adhesive.

According to one embodiment of the present invention, each of the assembling elements further has a plurality of air vents disposed on the attaching surface and covered by the adhesive.

According to one embodiment of the present invention, each of the air vents extends from the attaching surface to an inner surface of the engaging slot.

According to one embodiment of the present invention, each of the assembling elements further has a first fastening hole, the bracket has a plurality of second fastening holes, and the bracket is screwed on the assembling elements through the first fastening holes and the second fastening holes.

According to one embodiment of the present invention, the number of the at least one bracket is two, and the two brackets are fixed to two opposite edges of the display panel respectively.

In light of the above, the display module of the present invention includes assembling elements fixed to the protective plate. The display panel and the bracket are positioned to the assembling elements through the positioning protrusions disposed thereon, and the back cover is engaged to the assembling elements through the engaging slots disposed thereon. The protective plate is not stuck to the display panel, since no glue is used in the assembling and the positioning protrusions of the assembling elements are used instead. Accordingly, the display module is capable to disassemble the components of the display module for repair easily, and the shortcomings of the conventional display module that assembling tolerances and gap differences formed between the components of the display module during disassembling for repair can further be prevented.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
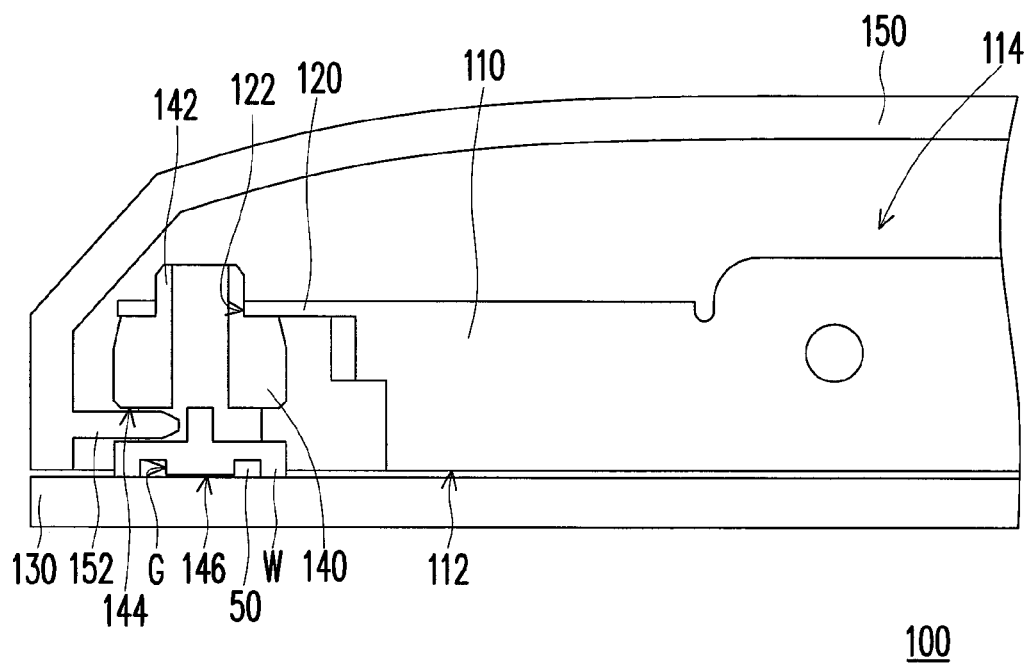
FIG. 1 is a partial cross-sectional schematic view of a display module according to an embodiment of the present invention.
Figure 2:
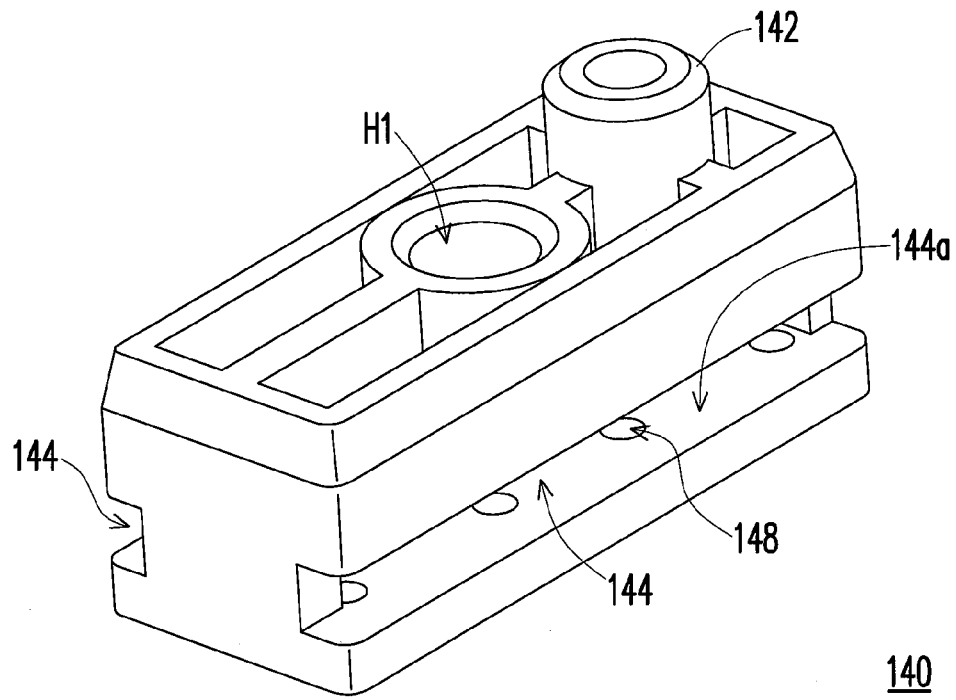
FIG. 2 is a schematic view of an assembling element of the display module in FIG. 1.
Figure 3:
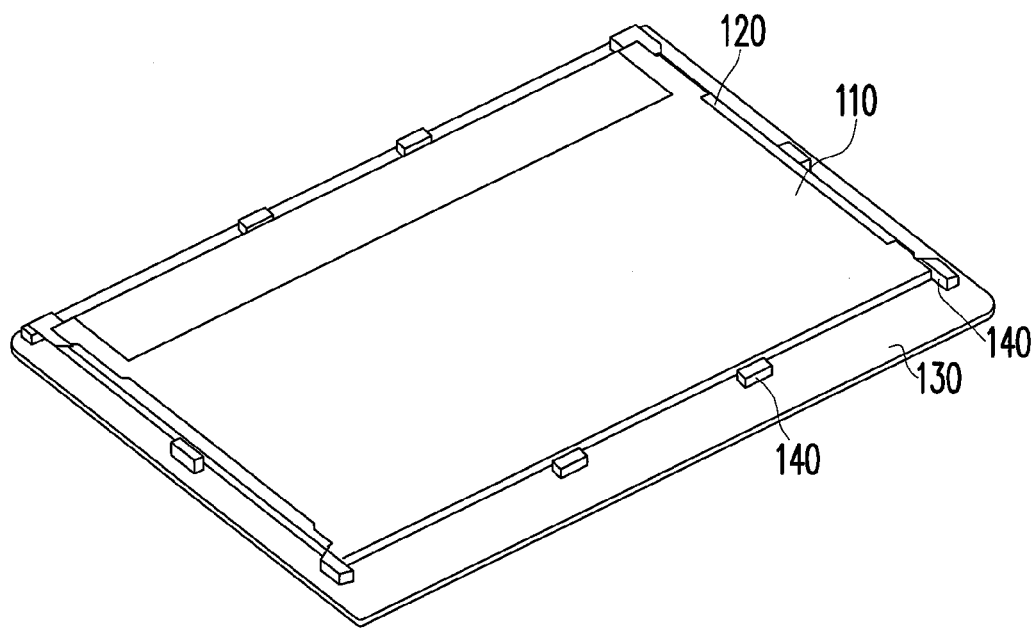
FIG. 3 is a partial schematic view of the display module in FIG. 1 illustrating the display panel is positioned to the protective plate through the assembling elements.

FIG. 1 is a partial cross-sectional schematic view of a display module according to an embodiment of the present invention. FIG. 2 is a schematic view of an assembling element of the display module in FIG. 1. FIG. 3 is a partial schematic view of the display module in FIG. 1 illustrating the display panel is positioned to the protective plate through the assembling elements. Referring to FIG. 1 to FIG. 3, the display module 100 of the present embodiment includes a display panel 110, at least one bracket 120, a protective plate 130, a plurality of assembling elements 140 and a back cover 150.

In the embodiment, the display panel 110 is, for example, a TFT-LCD (thin film transistor liquid crystal display) panel and can be a touch display panel, and the present invention is not limited thereto. The display panel 100 has a display surface 112 and a back surface 114 opposite to the display surface 112. The bracket 120 is fixed to the display panel 110. The at least one bracket 120 in this embodiment includes two brackets as shown in FIG. 2, and the two brackets 120 are fixed to the two opposite edges of the display panel 110 respectively by means of screwing or by other suitable assembling manner.

In addition, the protective plate 130 can be formed by glass, plastic or other transparent material. The peripheral of the protective plate 130 may be decorated with black ink for a purpose of obscuring or hiding the assembling elements. The protective plate 130 faces the display surface 112. The assembling elements 140 are fixed on the protective plate 130, wherein each of the assembling elements 140 has a positioning protrusion 142 and an engaging slot 144. And the bracket 120 is positioned on the assembling elements 140 through the positioning protrusions 142. The back cover 150 is to cover and protect the display panel 110 and also can be an ornamental cover of the display module 100. The back cover 150 faces the back surface 114, wherein the back cover 150 is engaged to the assembling elements 140 through the engaging slots 144.

More specifically, the assembling elements 140 are disposed on the edges of the protective plate 130 with the location of the assembling elements 140 corresponding to the brackets 120 in this embodiment. In other embodiments, the assembling elements 140 can be disposed at all the edges of the protective plate 130 and the present invention is not limited thereto.

Figure 4:
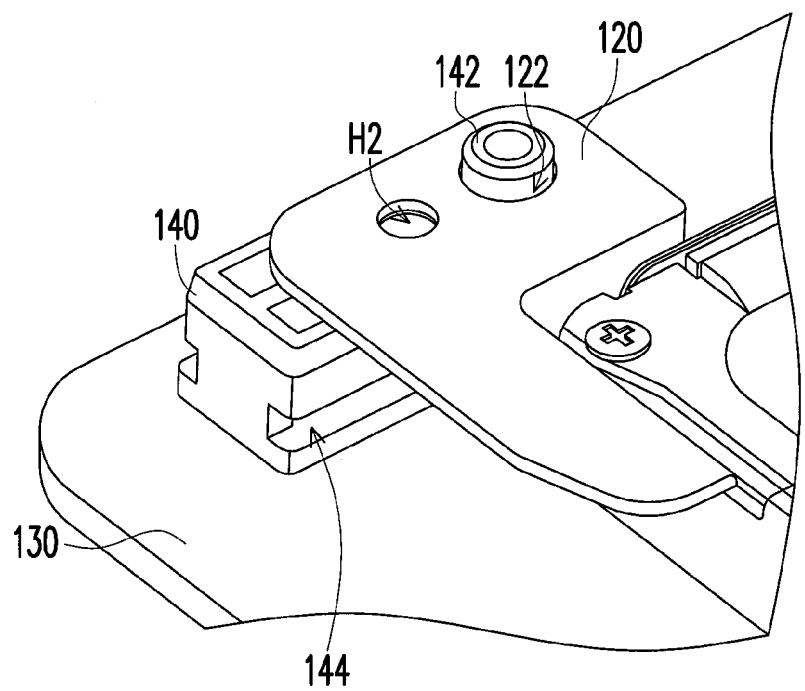
FIG. 4 is an enlarged view of a portion of FIG. 3.

FIG. 4 is an enlarged view of a portion of FIG. 3. Referring to FIG. 1, FIG. 2 and FIG. 4 together, in order to position the brackets 120 fixed with the display panel 110 to the protective plate 130, each of the brackets 120 has a plurality of positioning holes 122, and the positioning protrusions 142 of the assembling elements 140 are respectively inserted into the positioning holes 122. In this way, the brackets 120 are positioned by inserting the positioning protrusions 142 into the positioning holes 122.

Figure 5:
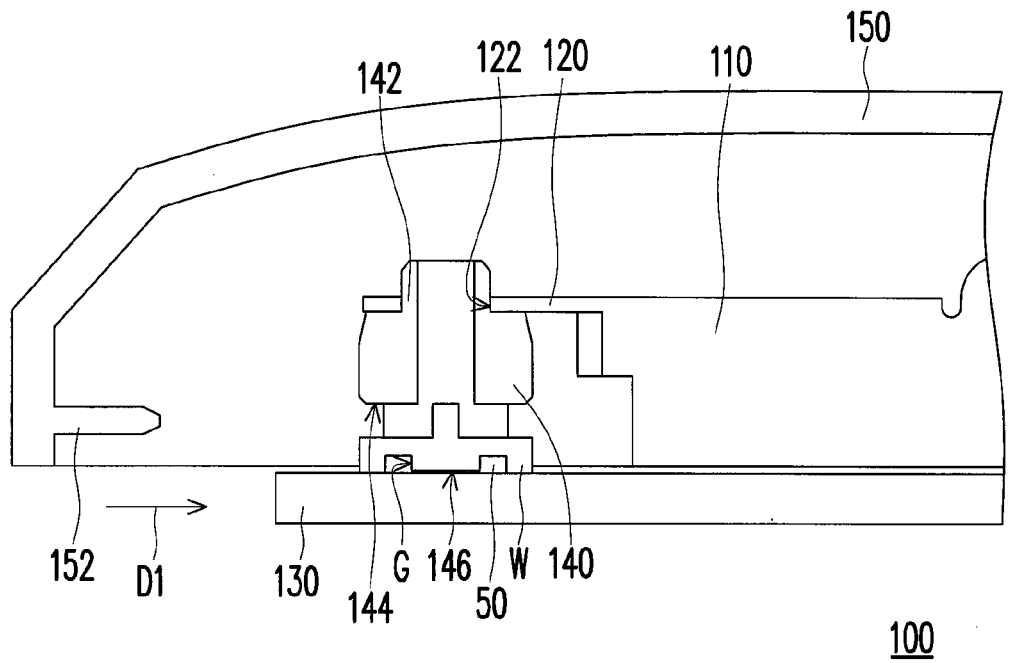
FIG. 5 shows before the back cover of the display module in FIG. 1 is engaged to the assembling element.

In addition, the back cover 150 has a plurality of hooks 152 disposed in the inner sidewalls near the edges of the back cover 150 (only one hook 152 is shown in FIG. 1). The hooks 152 are respectively engaged to the engaging slots 144 so that the back cover 150 can be engaged to the assembling elements 140. FIG. 5 shows before the back cover of the display module in FIG. 1 is engaged to the assembling element. Referring to FIG. 1 and FIG. 5 together, when the back cover 150 is engaged to the assembling elements 140, each of the hooks 152 is adapted to slide into the corresponding engaging slot along a direction D1 parallel to the back surface 114. In such configuration, the back cover 150 is fixed to both of the display panel 110 and the protective plate 130 only by means of their structural restrictions.

Figure 6:
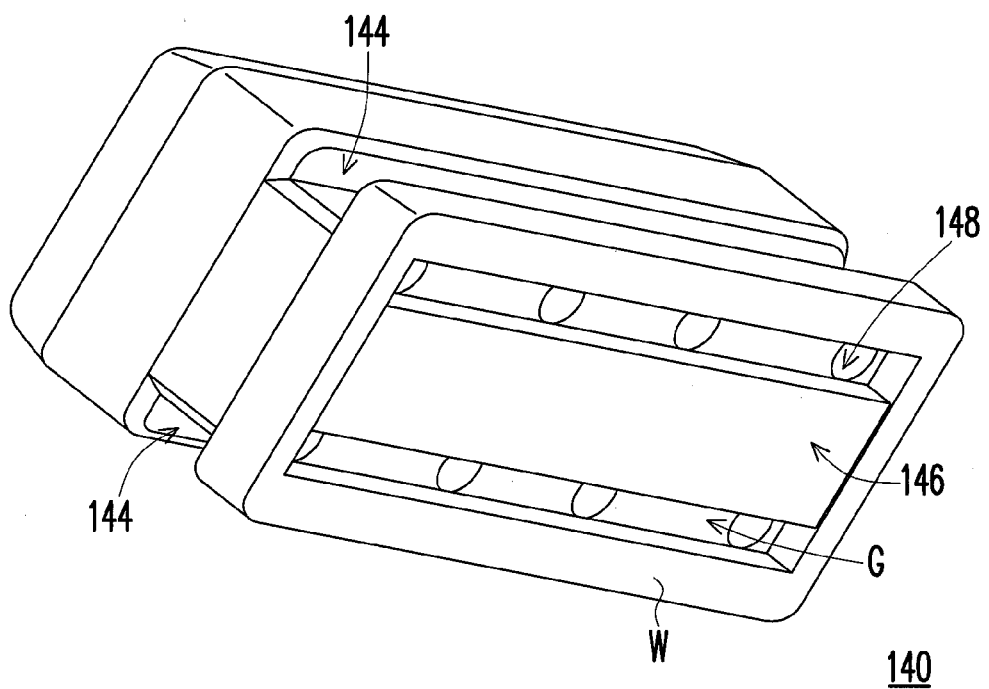
FIG. 6 is the assembling element of FIG. 2 viewing from the bottom side.

Then, the configuration of the assembling elements 140 are described as follows. FIG. 6 is the assembling element of FIG. 2 viewing from the bottom side. Referring to FIG. 1, FIG. 2 and FIG. 6 together, each of the assembling elements 140 has an attaching surface 146. In this embodiment, the assembling element 140 is fixed to the protective plate 130 through an adhesive 50 adhered between the attaching surface 146 and the protective plate 130. The adhesive 50 can be a double-sided foam tape, super glue or the like.

In order to prevent the adhesive overflow and affect the appearance of the display module, the assembling element 140 further has a wall W disposed on the attaching surface 146 and surrounding the adhesive 50. In addition, the assembling element 140 can also has an overflow groove G disposed on the attaching surface 146 and receiving the adhesive 50, specially the overflowed adhesive.

In general, air bubbles may be generated when the adhesive 50 is attached to objects, and thus in the embodiment, a plurality of air vents 148 can be disposed on the attaching surface 146 so as to exhaust the generated air bubbles. As shown in FIG. 6, the air vents 148 extend from the attaching surface 146 to an inner surface 144a of the engaging slot 144. The air vents 148 are covered by the adhesive 50 (only shown in FIG. 1 and FIG. 5) at the attaching surface 146 after the adhesive 50 is adhered. In this way, each of the assembling elements 140 is properly stuck on the edges of the protective plate 130.

In this embodiment, additional assembling elements 140 can also be disposed on the edges of the protective plate 130 on which the brackets 120 are not fixed as shown in FIG. 1. In this condition, the back cover 150 can be fixed to the protective plate 130 by respectively engaging the hooks 152 to the engaging slots 144 of the assembling elements 140 disposed on all of the edges of the protective plate 130 to achieve a better fixing effect.

After the display panel 110 fixed to the brackets 120 is positioned to the assembling elements 140 by respectively inserting the positioning protrusions 142 into the positioning holes 122, the display panel 110 can be firmly fixed to the assembling elements 140 by means of screwing. Therefore, a fastening hole H1 can be disposed on each of the assembling elements 140 and a plurality of fastening holes H2 can be correspondingly disposed at the brackets 120, so that the brackets 120 are screwed on the assembling elements 140 through the fastening holes H1 and H2. However, it has to be noted that the way of fastening the brackets 120 to the assembling elements 140 is not limited in the present.

In light of the foregoing, the display module of the present invention includes assembling elements fixed to the protective plate. The display panel and the bracket are positioned to the assembling elements through the positioning protrusions disposed thereon, and the back cover is engaged to the assembling elements through the engaging slots disposed thereon. The protective plate is not stuck to the display panel, since no glue is used in the assembling and the positioning protrusions of the assembling elements are used instead. Accordingly, the display module is capable to easily disassemble the components of the display module for repair, and the shortcomings of the conventional display module that assembling tolerances and gap differences may formed between the components of the display module during disassembling for repair can further be prevented. Furthermore, the assembling elements of the present invention are simple in structure and the manufacturing cost can also be reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display module, comprising:
a display panel having a display surface and a back surface opposite to the display surface;
at least one bracket fixed to the display panel;
a protective plate facing the display surface;
a plurality of assembling elements fixed on the protective plate, wherein each of the assembling elements has an attaching surface and is fixed to the protective plate through an adhesive adhered between the attaching surface and the protective plate, and each of the assembling elements further has a plurality of air vents disposed on the attaching surface and covered by the adhesive, wherein the bracket is fixed on the assembling elements, and the assembling elements are not connected together; and
a back cover facing the back surface, wherein the back cover is engaged to the assembling elements.

2. The display module as claimed in claim 1, wherein each of the assembling elements has a positioning protrusion, and the bracket is fixed on the assembling elements through the positioning protrusions.

3. The display module as claimed in claim 2, wherein the bracket has a plurality of positioning holes, and the positioning protrusions are respectively inserted into the positioning holes.

4. The display module as claimed in claim 1, wherein each of the assembling elements has an engaging slot, and the back cover is engaged to the assembling elements through the engaging slots.

5. The display module as claimed in claim 4, wherein the back cover has a plurality of hooks respectively engaged into the engaging slots.

6. The display module as claimed in claim 5, wherein each of the hooks is adapted to slide into the corresponding engaging slot along a direction parallel to the back surface when the back cover is engaged to the assembling elements.

7. The display module as claimed in claim 1, wherein each of the assembling elements further has at least one wall disposed on the attaching surface and surrounding the adhesive.

8. The display module as claimed in claim 1, wherein each of the assembling elements further has at least one overflow groove disposed on the attaching surface and receiving the adhesive.

9. The display module as claimed in claim 4, wherein each of the air vents extends from the attaching surface to an inner surface of the engaging slot.

10. The display module as claimed in claim 1, wherein each of the assembling elements further has a first fastening hole, the bracket has a plurality of second fastening holes, and the bracket is screwed on the assembling elements through the first fastening holes and the second fastening holes.

11. The display module as claimed in claim 1, wherein the at least one bracket comprises two brackets, and the two brackets are fixed to two opposite edges of the display panel respectively.

* * * * *